(12) United States Patent
Liu et al.

(10) Patent No.: US 11,036,572 B2
(45) Date of Patent: Jun. 15, 2021

(54) METHOD, DEVICE, AND COMPUTER PROGRAM PRODUCT FOR FACILITATING PREDICTION OF DISK FAILURE

(71) Applicant: EMC IP Holding Company LLC, Hopkinton, MA (US)

(72) Inventors: Bing Liu, Tienjin (CN); Xingyu Liu, Tienjin (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 153 days.

(21) Appl. No.: 16/365,782

(22) Filed: Mar. 27, 2019

(65) Prior Publication Data

US 2020/0133758 A1 Apr. 30, 2020

(30) Foreign Application Priority Data

Oct. 26, 2018 (CN) .......................... 201811261806.0

(51) Int. Cl.
*G06F 11/07* (2006.01)
*G06F 3/06* (2006.01)
*G06F 21/57* (2013.01)
*G06F 17/18* (2006.01)
*G06N 20/00* (2019.01)

(52) U.S. Cl.
CPC ........ *G06F 11/0727* (2013.01); *G06F 3/0616* (2013.01); *G06F 3/0653* (2013.01); *G06F 3/0683* (2013.01); *G06F 17/18* (2013.01); *G06F 21/572* (2013.01); *G06N 20/00* (2019.01)

(58) Field of Classification Search
CPC ............. G06F 11/0793; G06F 11/0727; G06F 11/0751; G06F 3/0616; G06F 3/0653
See application file for complete search history.

(56) References Cited

U.S. PATENT DOCUMENTS

| 10,223,230 | B2 * | 3/2019 | Jacoby | ................ G06F 11/3034 |
| 10,268,553 | B2 * | 4/2019 | Eggert | .................... G06F 11/16 |
| 2019/0004892 | A1 * | 1/2019 | Hopkins | ............. G06F 11/0793 |

* cited by examiner

*Primary Examiner* — Nadeem Iqbal
(74) *Attorney, Agent, or Firm* — Chamberlain, Hrdlicka, White, Williams & Aughtry (57) ABSTRACT

A method of facilitating prediction of a disk failure The method includes obtaining operation information and failure information associated with a plurality of disks, wherein the plurality of disks comprising a first set of disks indicated by the failure information as having a failure and a second set of disks indicated by the failure information as having no failure; determining validity of the failure information associated with a first set of disks based on system context information related to the storage system comprising the first set of disks; and in response to determining that the failure information associated with at least one of the first set of disks is valid, generating a machine learning model based on the operation information and the failure information associated with the first set of disks.

18 Claims, 6 Drawing Sheets

METHOD, DEVICE, AND COMPUTER PROGRAM PRODUCT FOR FACILITATING PREDICTION OF DISK FAILURE

CROSS-REFERENCE TO RELATED APPLICATION

This application claim priority to Chinese Patent Application No. 201811261806.0 filed on Oct. 27, 2018. Chinese Application No. 201811261806.0 is hereby incorporated by reference in its entirety.

FIELD

The present disclosure generally relates to a storage technology, and more specifically, the present disclosure relates to a method, a device, and a computer program product for facilitating prediction of a disk failure.

BACKGROUND

Various types of disks are used as main storage devices of storage systems. For example, a plurality of disks may form a storage system, e.g., a redundant array of independent disks (RAID) or RAID group, to provide data storage.

SUMMARY

Embodiments of the present disclosure provide a solution for facilitating prediction of a disk failure in order to reduce the data loss caused by a disk failure.

In a first aspect of the present disclosure, there is provided a method of facilitating prediction of a disk failure. The method comprises: obtaining operation information and failure information associated with a plurality of disks, the plurality of disks comprises a first set of set of disks indicated by the failure information as having a failure and a second set of disks indicated by the failure information as having no failure; determining validity of the failure information associated with the first set of disks based on system context information related to corresponding storage systems comprising the first set of disks; and in response to determining that the failure information associated with at least one of the first set of disks is valid, determining a machine learning model based on the operation information and the failure information associated with the at least one disk and the second set of disks, the machine learning model having a capability of predicting failure of a disk from operation information of the disk.

In a second aspect of the present disclosure, there is provided an electronic device. The electronic device comprises: a processor; and a memory coupled to the processor, the memory having instructions stored thereon which, when executes by the memory cause the device to perform acts comprising: obtaining operation information and failure information associated with a plurality of disks, the plurality of disks comprising a first set of disks indicated by the failure information as having a failure and a second set of disks indicated by the failure information as having no failure; determining validity of the failure information associated with the first set of disks based on system context information related to corresponding storage systems comprising the first set of disks; and in response to determining that the failure information associated with at least one of the first set of disks is valid, determining a machine learning model based on the operation information and the failure information associated with the at least one disk and the second set of disks, the machine learning model having a capability of predicting failure of a disk from operation information of the disk.

In a third aspect of the present disclosure, there is provided a computer program product, being tangibly stored on a computer-readable medium and comprises computer-executable instructions which, when executed, cause a machine to perform the method in accordance with the first aspect of the present disclosure.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, advantages and features of the present disclosure will become apparent through the detailed description of example embodiments of the present disclosure with reference to the accompanying drawings, where the same reference symbols generally refer to the same elements in the example embodiments of the present disclosure.

DETAILED DESCRIPTION OF EMBODIMENTS

Principles of the present disclosure will not be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one further embodiment." The term "first," "second" or the like may represent different or the same objects. Other definitions, either explicit or implicit, may be included below.

In various embodiments, the prediction of a disk failure is an important aspect for reducing data loss and/or maintaining normal operation of a system.

A solution for predicting disk failure with a statistical model is further proposed.

Figure 1:
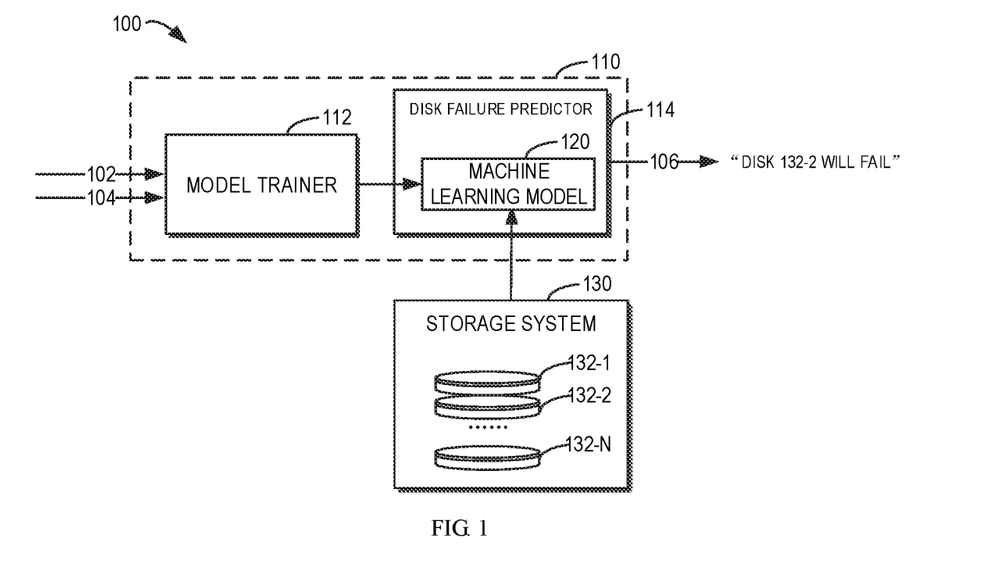
FIG. 1 illustrates a schematic block diagram of a legacy environment for prediction of a disk failure.

FIG. 1 illustrates a schematic block diagram of a legacy environment 100 for machine learning based prediction of a disk failure. In the environment 100, the failure prediction system 100 includes a model trainer 112 for training a machine learning model 120 based on training data. The training data employed may include operation information 102 associated with disks and failure information 104 indicating whether a corresponding disk fails. After having been trained, the machine learning model 120 may be used by a disk failure predictor 114 for predicting whether each disk (for example, one of disks 131-1, 131-2, . . . , 131-N, where N is an integer greater than or equal to 1) in a storage system 130 will fail. The machine learning model 120 may determine whether a disk will fail based on the operation information associated with the disk in the storage system 130. For example, machine learning model 120 may determine whether the disk 132-2 will fail based on the operation information associated with the disk 132-2. The disk failure predictor 110 will output a prediction result 106 indicating that the disk 132-2 will fail. This prediction result 106 may be provided to the storage system 130 or to another system/device, so as to perform corresponding acts for the failure prediction result of the disk, e.g., backing up data on the disk 132-2, swapping/repairing the disk 132-2, and the like.

In the prediction of a disk failure based on a machine learning model, accuracy of prediction of the machine learning model depends on data used in training of the model. However, if there is noise in the training data (e.g., incorrect or inaccurate information), then the accuracy of the machine learning model may be negatively impacted. The amount of noise in the training data depending on how the training data for the machine learning model is collected. Normally, the disks or the storage system generate statistics and record operation information associated with individual disks. Failure information, i.e., an indication on whether a disk fails, is determined based on whether the disk can process input/output (I/O) requests. This kind of determination of failure is only performed from a software perspective. It is generally hard to determine directly, automatically whether a disk fails, from a hardware perspective. However, the determination of hardware failures as such may be inaccurate. In addition to the cause of actual disk failure, there are also other causes why a disk cannot process I/O requests, and thus being marked as failed. These causes are related to specific context of the storage system.

For example, if disk firmware used in a storage system has an error, a plurality of disks associated therewith are all marked as failed in a short time, and this kind of failure rate is much greater than a normal failure rate of the storage system. Moreover, in topology of a storage system, disks providing actual storage spaces are further connected with a connection component to achieve interconnection or connection with other devices. These connection components, for example, may include a host bus adapter (HBA), an expander, a bottom plate and the like. These connection components may also be related to disk failure. If these connection components fail (e.g., due to a hardware failure or firmware failure), it will be unable to access disks connected therewith directly or indirectly, thereby impacting responses of disks to I/O requests. For example, given that a connection problem may be caused by firmware failure of some connection components, a disk (for example, a floppy disk) connected therewith is always online or offline such that the disk cannot process I/O requests normally. A further example is that, when multiple types of incompatible disks are mixed in the same link, for example, if a serial advanced technology attachment (SATA) disk and a serially attached (SA) small computer system interface (SCSI) disk (i.e., an SAS disk) are included in the same SAS link, it will cause the link to become unstable and thus prevent it from responding to I/O requests normally.

According to embodiments of the present disclosure, there is provided a solution for facilitating prediction of a disk failure. In order to determine a machine learning model for prediction of a disk failure, the obtained operation information and failure information associated with a plurality of disks is filtered. The plurality of disks includes a first set of disks indicated by the failure information as having a failure and a second set of disks indicated by the failure information as having no failure. In the first set of disks indicated by the failure information as having a failure, it is determined whether the failure information associated with the set of disks is valid based on system context information associated with corresponding storage systems including the first set of disks. If the failure information associated with at least one of the first set of disks is valid, the operation information and the failure information associated with the first set of disks and the second set of disks are used for determining the machine learning model, for use in prediction of a disk failure. Through this solution, invalid information impacting training of the machine learning model is filtered from the perspective of whole system, the remaining information is more advantageous for determining the machine learning model, such that the obtained machine learning model can predict disk failure more accurately.

Embodiments of the present disclosure will be described below in detail with reference to the drawings.

Figure 2:
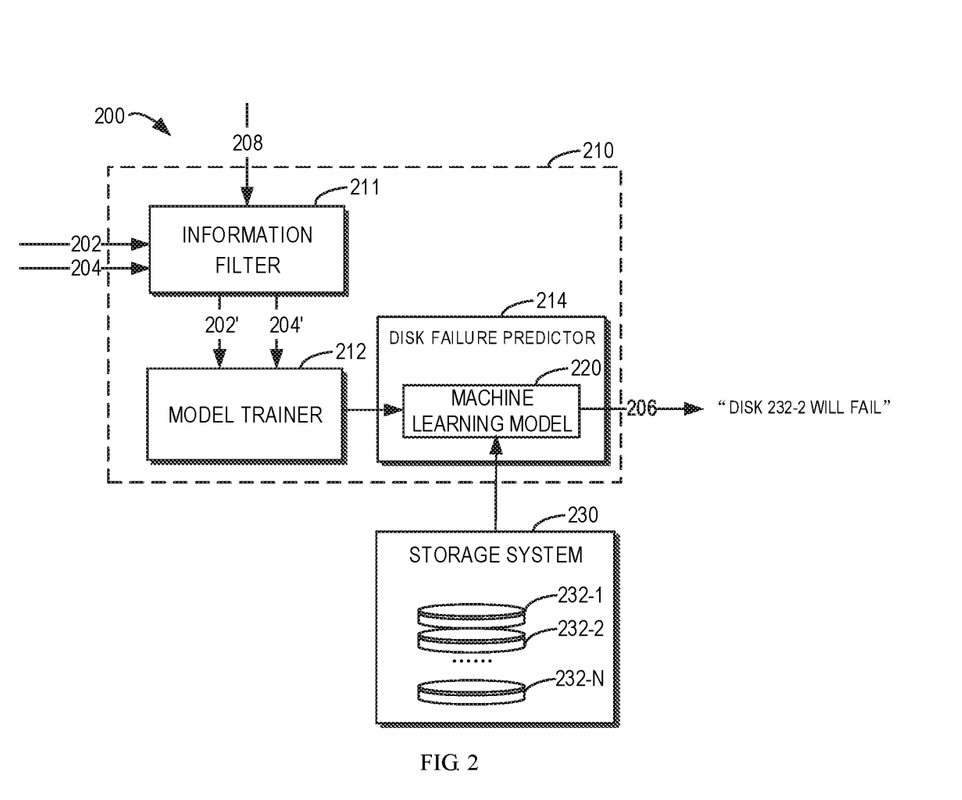
FIG. 2 illustrates a schematic block diagram of an environment for prediction of a disk failure according to some embodiments of the present disclosure.

FIG. 2 illustrates a schematic block diagram of an environment 200 for prediction of a disk failure according to some embodiments of the present disclosure. In the environment 200, a system 210 of prediction of a disk failure includes an information filter 211 and a model trainer 212. The information filter 211 is used to filter operation information 202 and failure information 204 associated with a plurality of disks. The system 210 of prediction of a disk failure further includes a model trainer 212 for receiving operation information 202' and failure information 204' after filtering is executed by the information filter 211, and determining a machine learning model 220 based on the obtained information. Although shown as separated components, it should be appreciated that the information filter 211 and the model trainer 212 can be implemented by the same computing device or included in the same computing device, to accomplish the purpose of training the machine learning model 220.

The determined machine learning model 220 is provided to a disk failure predictor 214 for predicting disk failure, for example, predicting failure of any one of disks 232-1, 232-2, . . . , 232-N (where N is an integer greater than or equal to 1) in the storage system 230. The disk failure predictor 214 provides a prediction result 206 of the machine learning model 220. The storage system 230 can be referred to as storage system to be detected, and one or more disks to be detected can be referred to as disks to be detected.

During prediction of a disk failure, the disk failure predictor 214 can obtain, from the storage system 230, operation information associated with disks to be detected (for example, the same type of operation information as the operation information for training the machine learning model 220), and the obtained operation information acts as an input of the machine learning model 220. The trained machine learning model 220 may determine failure of disks to be detected as the prediction result 206 based on the input. The prediction result 206 indicates whether the disks to be detected are to fail in a period of time. For example, in the example of FIG. 2, the prediction result 206 may indicate that the disk 232-2 in the storage system 230 will fail.

The disk failure predictor 214 is used in a model obtained by training the machine learning model 220, and therefore can be implemented as a computing device separated from the information filter 211 and/or model trainer 212, which is, for example, deployed at respective sites where it is required to perform prediction of a disk failure for the storage system. Of course, the three components in the system 210 of prediction of a disk failure may also be implemented by the same computing device.

Figure 3:
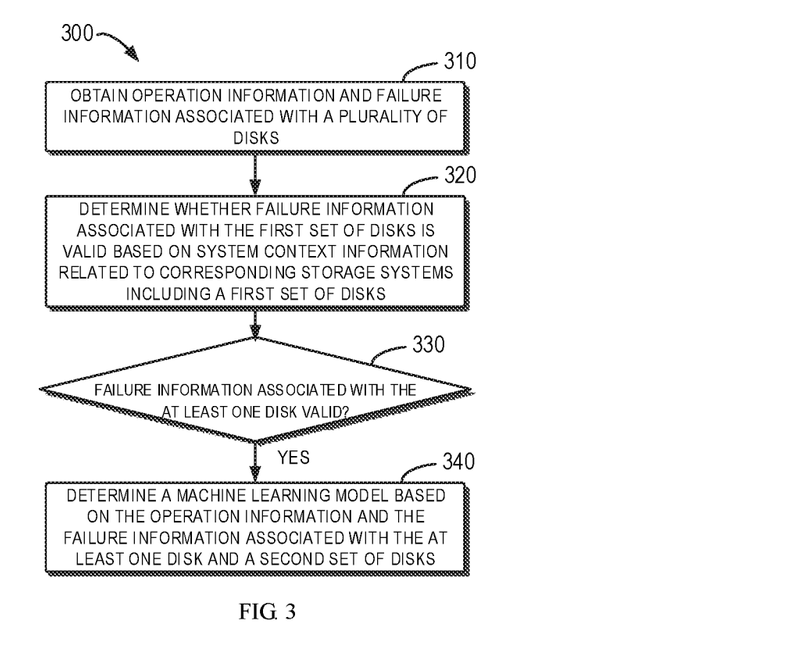
FIG. 3 illustrates a schematic block diagram of an environment for prediction of a disk failure according to some other embodiments of the present disclosure.

For convenience of illustration, how the information filter 211 and the model trainer 212 determine a machine learning model for prediction of a disk failure will be described below with reference to the following flowchart. FIG. 3 illustrates a flowchart of a procedure 300 for facilitating prediction of a disk failure according to embodiments of the present disclosure. The procedure 300 is implemented by the information filter 211 and the model trainer 212 in FIG. 2. For convenience of illustration, the procedure 300 will be described with reference to FIG. 2.

At block 310, the information filter 211 obtains the operation information 202 and the failure information 204 associated with a plurality of disks. In an information filtering procedure, the operation information 202 and the failure information 204 associated with the plurality of disks obtained by the information filter 211 may be collected by these disks or the corresponding storage systems, and may be pre-recorded in one or more databases.

The operation information 202 associated with each disk may include various types of attribute information associated with operations of the disk. Non-limiting examples of the attribute information may include but are not limited to: attribute values of S.M.A.R.T, statistical information of battery management system (BMS) (which is particularly suitable for an SAS disk), and other statistical information of the disk. This type of statistical information typically also includes corresponding timestamps. Alternatively or additionally, the operation information may further include inherent attributes of disks, including one or more of the following: types, models, suppliers and the like, of the disks. Types of disks may include various types of storage devices, such as hard disks, floppy disks, magnetic disks, magnetic tapes and the like. Different types of disks may be further classified. For example, currently, many types of hard disks are widely applied in storage systems, due to large capacities thereof, which include SATA disks, SAS disks, solid state disks (SSDs), hard disk drives (HDDs) and the like.

The failure information 204 associated with each disk may indicate whether the disk has failed. The failure information may be monitored based on whether the operating systems of the corresponding storage systems can process I/O requests for the disks. If it is determined that one disk is unable to process I/O requests, the disk can be marked as failed. If it is monitored that the disk can process I/O requests normally, the disk can be marked as healthy. The healthy or failed mark may be collected or recorded periodically as the failure information 204 associated with the disks. In addition to indicating whether the disk is healthy or has failed, the failure information 204 of each disk may further include time information indicating occurrence time when the disk is monitored as healthy or failed.

The operation information 202 and the failure information 204 may be from one or more storage systems. The corresponding storage systems may monitor and report hardware configuration, running time statistics and time logs as monitored during operation, and upload the same to a data analysis system. Then, after the aforementioned data have been parsed and formatted, the operation information and failure information of the corresponding disks may be presented in the form of structured data.

In some embodiments, depending on the failure information 204, the plurality of disks associated therewith includes a first set of disks indicated by the failure information as having a failure and a second set of disks indicated by the failure information as having no failure. According to embodiments of the present disclosure, the information filter 211 filters out noise information (i.e., incorrect information, in particular incorrect failure information) from the operation information 202 and the failure information 204 associated with the first set of disks.

At block 320, the information filter 211 determines the validity of the failure information 204 associated with the first set of disks based on system context information related to the storage systems including the first set of disks. The validity of failure information is used for evaluating failure due to a disk itself having a failure or a system cause outside the disk that causes a failure. If the disk is mistakenly marked as failed due to a system cause, the failure information is deemed invalid. The system context information related to the storage system where the disk is located indicates a system context where the disk is located, thereby enabling the disk failure cause to be observed from the whole system, rather than from the perspective of the disk. As such, it can be determined that there is a further cause for the failure information 204 indicating that the disk has a failure (which is not caused by a hardware error of the disk). It can be determined, for each of the first set of disks, whether the associated failure information is valid.

In some embodiments, the system context information may cover other aspects of a disk, for example, error information related to firmware, because a firmware error of disk may impact processing of the disk on I/O requests. Therefore, the system context information may include firmware error information indicating that disk firmware of at least of the corresponding storage systems has an error. In some other embodiments, the system context information may also include topology information of the corresponding storage systems, and further failure information indicating that a connection component of the corresponding storage systems has a failure. Disks are typically coupled to one another via connection components, and, thus, these components are required for accessing to the disks. If the connection component fails, then the disks are unable to process I/O requests and thus may be marked as failed. In addition, system-level failure (for example, a firmware error of disk and/or connection component error) often impacts a plurality of devices, and if there is a sudden increase in the number of disks marked as having failure in a system in a short period, it may be caused by a system-level error, rather than an error of disk per se. Hence, the system context information may also include a predetermined failure rate of storage systems.

Figure 4:
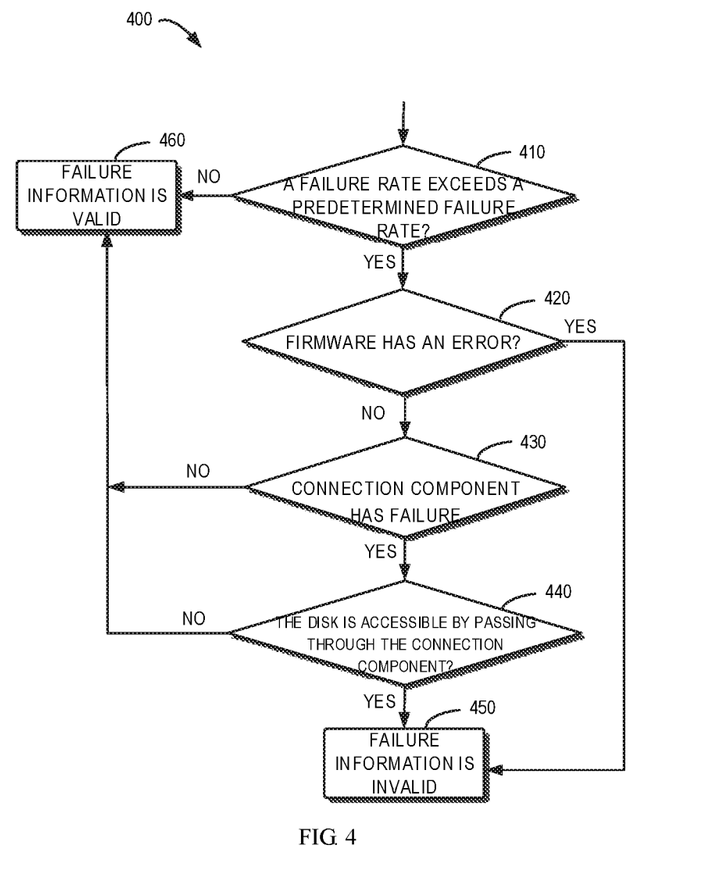
FIG. 4 illustrates a flowchart of a procedure for facilitating prediction of a disk failure according to some embodiments of the present disclosure.

The information filter 211 may determine the validity of the failure information 204 based on one or more items of system context information as above. FIG. 4 illustrates a procedure 400 for determining, the validity of failure information associated with one (which is hereinafter referred to as current disk) of the first set of disks based on the above three aspects of the system context information. The procedure 400 may be regarded as one implementation of block 320 of the procedure 300, and therefore may be implemented by the information filter 211.

At block 410, the information filter 211 determines whether failure rates of failed disks for storage systems where a current disk is located in a predetermined period of time exceeds the predetermined failure rate. The failure rate refers to a ratio of the number of disks marked as having failure (which is marked by failure information) in a storage system per unit of time to the total number of disks. As a type of system context information, the predetermined failure rate refers to an acceptable failure rate of failed disks for a storage system in a normal case. The failure rate may be determined from a historical failure rate distribution of the system, e.g., over a long period of time. Typically, the predetermined failure rate of each storage system is maintained at a stable level. In one storage system, failed disks in a certain period of time may include occurrence time of failure indicated by the associated failure information. In other words, the number of failed disks in the storage system in a period of time when the disk is marked as failed is taken into account.

If the number of failed disks in a certain period of time is below the predetermined failure rate, it means that failure of the current disk falls within a normal failure range of the system, thus, at block 460, the information filter 211 determines the failure information associated with the disk is valid. If it is determined that there is a sudden increase in the number of failed disks in the system in a certain period of time, it means that there may be a system-level error which causes the disk failure. In this case, the information filter 211 continues to consider other system context information.

Specifically, the procedure 400 proceeds to block 420, where the information filter 211 determines whether the disk firmware used by the current disk has an error. The information filter 211 may make a determination based on firmware error information of the erroneous disk firmware used by the storage system where the current disk is located. The disk firmware is typically applied to a plurality of disks. The disk firmware has an error may be caused by a version of the disk firmware has an error or the current version of the disk firmware cannot support processing of certain I/O requests in the storage system. For example, certain firmware versions are probably unable to process mixed read/write requests and non-read/write requests simultaneously, and this will result in an internal reset of disk such that the disk goes offline and is unable to process subsequent I/O requests. Although the disk cannot process I/O requests due to the firmware error of the disk, the hardware of the disk is probably undamaged and thus can continue to operate after the problem of the disk firmware has been eliminated.

If it is determined that the disk firmware used by the current disk has an error based on the firmware error information, the information filter 211 determines at block 450 that the failure information associated with the disk is invalid. If it is determined, based on the firmware error information, that the erroneous disk firmware is not used by the current disk, the information filter 211 may determine that the failure information associated with the disk is valid, or may further reference other system context information for further evaluation. For example, in the example of FIG. 4, if it is determined that the erroneous disk firmware is not used by the current disk, the information filter 211 may further determine whether the failure information is valid based on factors related to system connection.

Specifically, at block 430, the information filter 211 determines whether a connection component of the storage system where the current disk is located has a failure. Failure of a connection component may be indicated by further failure information associated with the connection component in the system context information. The connection component is a component for interconnecting different disks in the storage system, to form a topology structure, for example, one or more redundant arrays of independent disks (RAIDs) or a RAID group. The connection component, for example, may include a host bust adapter (HBA), an HBA port, disk array enclosure (DAE), an expander, a bottom plate, a frame, various connection lines and the like.

Failure of a connection component may include failure of firmware used by the connection component (firmware failure) and/or failure of connection component on hardware (hardware failure). If a connection component in a storage system fails, disks accessible via the connection component are all unable to process I/O requests such that all of the associated failure information marks the disk as failed. Typically, firmware failure of the connection component may be marked directly (which is determined, for example, through known firmware problems). Hardware failure of a connection component may be determined by recording hardware errors occurred within a given time window, or may be determined indirectly. In the case of determining indirectly, it may be determined whether all disks accessible via the connection component are marked as failed, and if all the disks are marked as failed, then the failure cause may be the connection component, rather than the disk per se. For example, if all disks belonging to the same DAE or attaching to the same HBA port are marked as having failure, it may be determined that the DAE or HBA port has a failure, thereby causing some or all of these disks being marked as failed.

If the information filter 211 determines that no connection component is marked as having a failure, it may be determined at block 460 that the failure information associated with the current disk is valid. If it is determined that the connection component has a failure, at block 440, the information filter 211 identifies whether it is required to pass through the connection component for accessing to the current disk based on topology information. The topology information is also a type of system context information indicating how various components in the storage system are connected to each other. Based on the topology information, the information filter 211 may determine that it is necessary to pass through the connection component having a failure for accessing to the current disk.

If it is determined that it is required to pass through the connection component having a failure for accessing to the current disk, the information filter 211 determines at block 450 that the failure information associated with the current disk is invalid. In this case, the failure of the connection component is probably the cause why the current disk is marked as having a failure, and the current disk may still operate normally in terms of hardware. Therefore, the associated failure information is invalid and thus cannot be adopted. If it is determined that it is not required to pass through the erroneous connection component for accessing to the current disk, the information filter 211 determines at block 460 that the failure information associated with the current disk is valid.

It would be appreciated that, although FIG. 4 illustrates a plurality of blocks in a particular order, the order is provided merely as an example. The procedure 400 may further include additional blocks not shown and/or may omit the blocks as shown, and the order of the blocks may be changed. For example, it is feasible to consider only one or more aspects of the system context information as mentioned above, and the corresponding blocks are removed from FIG. 4 accordingly. For example, the information filter 211 may determine that the failure information associated with the disk is valid after it is determined at block 420 that the disk failure is not an error, and there is no need to perform subsequent steps. In some examples, the block 410 may also be omitted. In some other examples, the block 420 may be performed concurrently with blocks 430 and 440.

For each of the first set of disks, its validity may all be determined by following the procedure 400. Therefore, it may be determined that the first set of disks include disks having valid failure information 204 and disks having invalid failure information 204.

Continuing to refer to the procedure 300, at block 330, after verifying validity for each of the first set of disks, the information filter 211 determines whether the failure information associated with at least one of the first set of disks is valid. The information filter 211 may filter out invalid failure information 204, and determine disks associated with the invalid failure information, and further filter out the operation information 202 associated with the determined disks. The information filter 211 may determine at least one of the first set of disks contains valid failure information. The information filter 211 may provide the filtered operation information 202' and failure information 204' to the model trainer 212. The filtered operation information 202' and failure information 204' will include the operation information and the failure information associated with the identified at least one of the first set of disks and the second set of disks.

If it is determined that the failure information associated with the at least one of the first set of disks is valid, at block 340, the model trainer 212 may determine a machine learning model 220 based on the operation information 202' and the failure information 204' associated with the at least one disk and the second set of disks. Therefore, the determined machine learning model may have the capability of predicting failure of a disk from operation information of the disk. The machine learning model may be regarded as a function representing a relation or mapping between an input (operation information) and an output (failure information). The training procedure of the machine learning model is to constantly update parameters involved in the function with training data (i.e., the operation information 202' and the failure information 204'), thereby achieving a convergence objective.

In some embodiments, the model trainer 212 may select various types of machine learning models. Examples of some machine learning models may include a random forest models, a decision tree, a support vector machine models (SVM) and a neural network model. Structures of these machine learning models may be designed and selected according to needs. Typically, if a machine learning model is designed to be deeper (i.e., it has more layers and more nodes), then the capability of the machine learning model is more powerful. The model trainer 212 may train the machine learning model with various model training algorithms, such as stochastic gradient descent, forward propagation, backward propagation and the like. The type of the machine learning model and the training algorithm employed in the model trainer 212 may be any type of model and algorithm existing currently or to be developed in the future, and the scope of the present disclosure is not limited in this aspect.

According to embodiments of the present disclosure, training of the machine learning model may be improved by filtering out invalid (noise) information portions out of the operation information and the failure information for training, such that the machine learning model may be able to learn more efficient and accurate prediction of a disk failure. Filtering the training data is applicable to training various machine learning models, so as to accomplish the purpose of disk prediction. Therefore, this kind of filtering of training data is universal and expandable, is not limited to the application scenario for a particular storage system and/or a particular type of machine learning model.

In some embodiments, if it is determined at block 330 that all the failure information 204 is invalid after verifying validity of the failure information 204 associated with the first set of disks, the model trainer 212 will not determine the machine learning model with the obtained operation information 202 and failure information 204. Further operation information and failure information associated with other disks may be obtained for determining the machine learning model. Of course, it is also required to filter the further operation information and failure information via the information filter 211.

In some embodiments, the machine learning model 220 may also be determined based on a performance metric (which is also referred to as the first performance metric). The performance metric refers to a metric for processing accuracy of a machine learning model. The performance metric may represent a probability that the machine learning model 220 predicts correctly, from a plurality of disks, disks of a first set of disks having valid failure information in a first set of disks, or a probability that the machine learning model 220 incorrectly predicts a second set of disks as failed.

There may be various types of performance metrics for the machine learning model. In one example, it is assumed that a perdition result of a disk having a failure is marked as positive (for example, the value of the prediction result is 1), and the prediction result of a disk having no failure is marked as negative (for example, the value of the prediction result is 0). Statistically, the probability that the machine learning model 220 correctly predicts, from the plurality of disks, disks of the first set of disks having valid failure information in the first set of disks may be referred to as a true positive rate (TPR), i.e., a capability of the model to provide a correct alarm. A probability that the machine learning model 220 incorrectly predicts the second set of disks as failed may be referred to as a false positive rate (FPR), i.e., a capability of the model to provide a false alarm. The TPR and FPR may be presented as a Receiver Operating Characteristic (ROC) curve, respectively. In an ideal case, the higher the TPR, the better; and the lower the FPC, the better.

In general, a threshold TPR or threshold FPR may be configured during model training, and then, a specific configuration, hyperparameters, a training solution (for example, the number of times of iterations of training, use of training data, a convergence objective, a training algorithm and the like), and the like, of the machine learning model, may be selected based on the threshold TPR or threshold FPR. The model parameters are optimized constantly by training, such that the machine learning model 220 meets a predetermined performance metric.

However, the trained machine learning model focuses on failure prediction of a single disk, to predict, for operation information associated with the single disk, whether the disk will fail. The single machine learning model 220 does not review the performance for prediction of a disk failure from system level. In other words, the single machine learning model has a fixed value of TPR or FPR, and therefore has the same capability of prediction of a disk failure for storage systems to be predicted. However, during actual operation of a storage system, stability of the system will be changed. For example, if many disks in a system (for example, a RAID6 system) have failed, it may only be possible to predict correctly failure of the rest disks by using a machine learning model having a higher TPR, as compared to the case that the disk has no failure. Hence, no satisfactory prediction result may be obtained all the time by using a trained single machine learning model to continuously perform prediction of a disk failure for a storage system.

Figure 5:
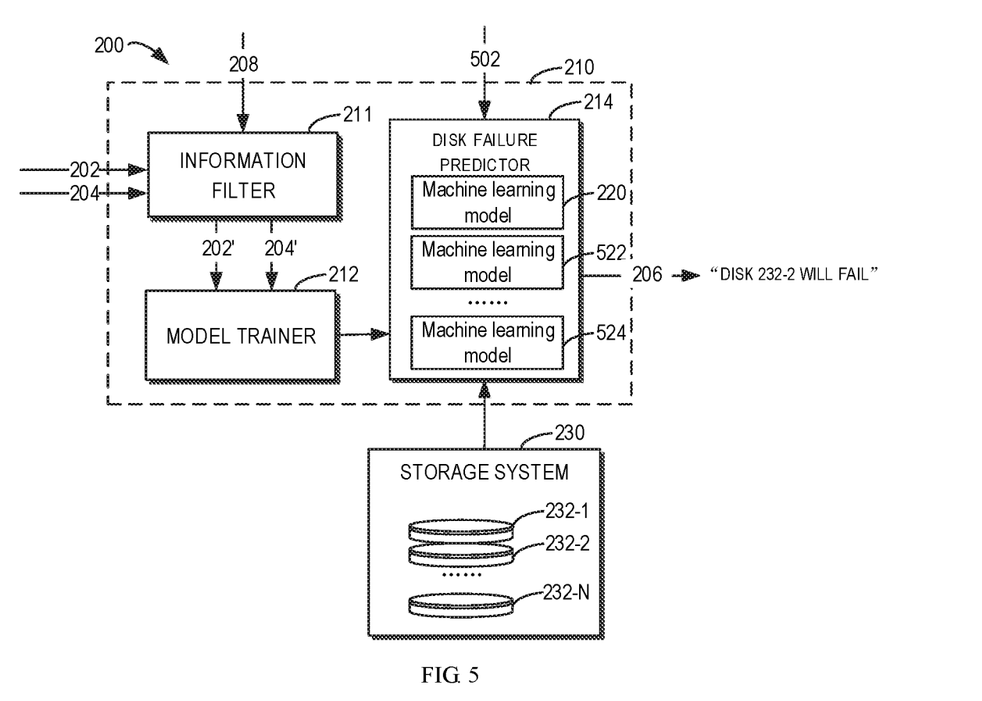
FIG. 5 illustrates a flowchart of a procedure for facilitating prediction of a disk failure according to some other embodiments of the present disclosure.

In some embodiments of the present disclosure, it is proposed to determine a plurality of machine learning models with different performance metrics. In this case, when a model is used, one of the plurality of machine learning models may be selected for prediction of a disk failure based on stability of a storage system to be detected. FIG. 5 illustrates an example of the system 200 of prediction of a disk failure. In FIG. 5, in addition to the machine learning model 220, the model trainer 212 trains one or more further machine learning models, for example, the machine learning models 522, 524, further based on the filtered operation information 202' and the failure information 204'. Training of the machine learning models 522 and/or 524 is similar to that of the learning model 220.

Although based on the same training data (i.e., the operation information 202' and the failure information 204') as that for the machine learning model 220, the model trainer 212 may train the machine learning models 522 and/or 524 based on a performance metric different from that for the machine learning model 220. The machine learning models 522 and/or 524 may be of different types than the machine learning model 220. For example, the machine learning model 220 may be a neural network model, the machine learning model 522 may be a random forest model, and the machine learning model 524 may be a support vector machine model. Alternatively, the machine learning models 220, 522 and 524 may be models of the same type, but varied in terms of model configuration, hyperparameters, a training solution and the like. Therefore, these machine learning models can be provided with different performance metrics, for example, different TPRs or FPRs.

It would be appreciated that, although FIG. 5 illustrates three machine learning models, the model trainer 212 may determine fewer (for example, two) or more machine learning models.

The machine learning models 220, 522 and 524 shown by the model trainer 212 are provided to the disk failure predictor 214. In use, the disk failure predictor 214 may select, one of the machine learning models 220, 522 and 524 based on a performance metric corresponding to a stability level 502 of the storage system 230 to be detected, for predicting failure of a disk (for example, any one of disks 232-1, 232-2, ... 232-N) to be predicted. The stability level 502 of the storage system 230 refers to that disks for storage included in the storage system 230 can be operated stably, and specifically, may be determined based on the number of failed disks in the storage system 230. As a result, along with the operation of the storage system 230, the stability level may vary with time.

If one or more disks in the storage system 230 have failed, it indicates the stability level 502 of the storage system 230 is low. On the other hand, if there is no disk failure or only a small number of failed disks in the storage system, it indicates the stability level of the storage 230 is high. In the case that the stability level 502 of the storage system 230 is low, the disk failure predictor 214 may select, from the machine learning models 220, 522 and 524, a machine learning model with a high TPR (thus, probably with a high FPR) to perform prediction of a disk failure, thereby enabling faster and more reliable detection on disk failure.

When the prediction of a disk failure is performed with the machine learning model 220 in the example of FIG. 2 or with one model selected from the plurality of machine learning models in the example of FIG. 5, if the prediction result 206 outputted by the machine learning model indicates a disk to be detected will fail in a future period of time, the disk may be marked as "will fail" or "dying", and for example, the disk 232-2 may be marked as "will fail" Different from the disks marked as "failed," the "will fail" disks can still process I/O requests, thereby exerting no extra I/O processing pressure on other disks of the storage system.

In the case of predicting that a disk will fail, some acts may be executed to handle the case that the disk will fail. In one example, since the disk is still able to process I/O requests, copy reconstruction may be performed to replicate data in healthy extents of the disk to other disks, while without involving I/O reconstruction of other disks. This kind of copy reconstruction can accelerate reconstruction and exert a pressure on normal I/O of the storage system 230. Copy reconstruction may be performed by the system 210 or other system or device obtaining the prediction result 206.

In some examples, if the disk marked as "will fail" has a failure subsequently in practice, the copy reconstruction procedure may be stopped, and the disk is marked as "failed." If copying of data has not been completed, reconstructing data may be continued using a normal disk reconstruction procedure. When a disk of the storage system 230 has failed (for example, the disk 232-2 is marked as "failed"), the stability level of the storage system 230 will drop. Thereafter, when predicting whether other disks in the storage system 230 fail, different machine learning models may be selected to continue to perform prediction of a disk failure based on the dropped stability level.

Figure 6:
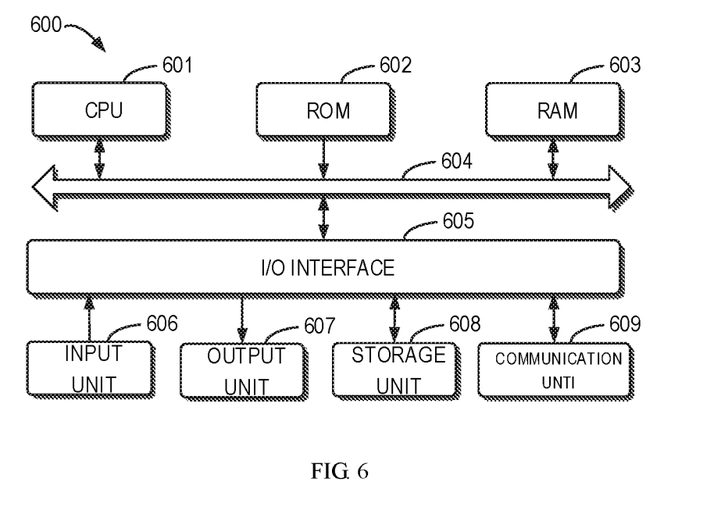
FIG. 6 illustrates a block diagram of an example device that can be used to implement embodiments of the present disclosure.

FIG. 6 illustrates a schematic block diagram of an example device 600 that may be used to implement embodiments of the present disclosure. The device 600 may be implemented as the information filter 211, model trainer 212 and/or disk failure detector 214 in FIG. 2 and/or FIG. 4. The device 600 can be may be used to implement the procedure 300 in FIG. 3 and/or the procedure 400 in FIG. 4.

As shown, the device 600 includes a central process unit (CPU) 601, which may perform various suitable acts and processing based on the computer program instructions stored in a read-only memory (ROM) 602 or computer program instructions loaded to a random-access memory (RAM) 603 from a storage unit 608. The RAM 603 may also store various kinds of programs and data required by the operations of the device 600. The CPU 601, the ROM 602 and the RAM 603 are connected to each other via a bus 604. An input/output (I/O) interface 605 is also connected to the bus 604.

A plurality of components in the device 600 is connected to the I/O interface 605, including: an input unit 606, for example a keyboard, a mouse and the like; an output unit 607, for example, various kinds of display and loudspeakers etc.; a storage unit 608, for example, a disk and an optical disk etc.; and a communication unit 609, for example a network card, a modem, a wireless transceiver and the like. The communication unit 609 allows the device 600 to exchange information/data with other devices via the computer network, such as Internet, and/or various telecommunication networks.

Methods and processes described above, for example the procedure 300 and/or the procedure 400, may be performed by the processing unit 601. For example, in some embodiments, the procedure 300 and/or procedure 400 may be implemented as a computer software program or a computer program product tangibly included in the machine-readable medium, such as a non-transient computer readable medium, such as, the storage unit 608. In some embodiments, part of the entire computer program may be loaded and/or mounted to the device 600 via the ROM 602 and/or the communication unit 609. When the computer program is loaded to the RAM 603 and executed by the CPU 601, one or more steps of the above described procedure 300 and/or procedure 400 may be implemented. Alternatively, the CPU 601 may be configured to perform the procedure 300 and/or procedure 400 in other embodiments via any other suitable manners (e.g., by means of firmware).

Those skilled in the art would understand that various steps of the method of the disclosure above may be implemented via a general purpose computing device, which may be integrated on a single computing device or distributed over a network composed of a plurality of computing devices. Alternatively, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several apparatuses or sub-apparatuses of the device have been mentioned in detailed description above, such partition is only exemplary with no limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure, for those skilled in the art, the present disclosure may have various alternations and changes. Any modifications, equivalents and improvements made within the spirits and principles of the present disclosure should be included within the scope of the present disclosure.

We claim:

1. A method of facilitating prediction of a disk failure, comprising:
    obtaining operation information and failure information associated with a plurality of disks, the plurality of disks in a storage system comprising a first set of disks indicated by the failure information as having a failure and a second set of disks indicated by the failure information as having no failure;
    determining validity of the failure information associated with the first set of disks based on system context information related to the storage system;
    in response to determining that the failure information associated with at least one of the first set of disks is valid, generating a machine learning model based on the operation information and the failure information associated with the first set of disk and the second set of disks, the machine learning model having a capability of predicting failure of a disk from operation information of the disk, wherein generating the machine learning model comprises:
        selecting the machine learning model from a plurality of machine learning models, wherein selecting the machine learning model comprises:
            selecting the machine learning model based on a first performance metric, the first performance metric indicating a probability that the machine learning model detects correctly that at least one of the first set of disks as having a failure or a probability that the machine learning model incorrectly detects that the second set of disks as having a failure; and
    identifying, using the machine learning model, that a disk of the plurality of disks in the storage system may fail.

2. The method of claim 1, wherein the system context information comprises firmware error information indicating that disk firmware used by the storage system has an error, and determining the validity of the failure information associated with the first set of disks comprises:
    determining, based on the firmware error information, that the failure information associated with the first set of disks using the erroneous disk firmware is invalid.

3. The method of claim 1, wherein the system context information comprises topology information of the storage system and further failure information indicating whether a connection component in the storage system has a failure, and determining the validity of the failure information associated with the first set of disks comprises:
    in response to the further failure information indicating that the connection component has a failure, identifying, based on the topology information, at least one of the first set of disks that is accessible without passing through the connection component; and
    determining that the failure information associated with the first set of disks is valid.

4. The method of claim 1, wherein the system context information comprises a predetermined failure rate of failed disks for the storage system and the failure information further indicates occurrence time of failure of the first set of disks, and wherein determining the validity of the failure information associated with the first set of disks comprises:
    determining whether a failure rate of the storage system in a predetermined period of time exceeds the predetermined failure rate, the predetermined period of time comprising the occurrence time; and
    in response to determining that the failure rate of the storage system is below the predetermined failure rate, determining that the failure information associated with the first set of disks is valid.

5. The method of claim 1, wherein:
    selecting the machine learning model further comprises using a performance metric corresponding to a stability level of a storage system.

6. The method of claim 5, wherein the stability level of the storage system to be detected is determined based on the number of failed disks in the storage system to be detected.

7. The method of claim 1, wherein the machine learning model is based on at least one of the following: a random forest model, a support vector machine model, and a neural network model.

8. The method of claim 1, wherein the operation information comprises at least one of the following: operating state statistical information, types of the plurality of disks, models of the plurality of disks, and suppliers of the plurality of disks.

9. An electronic device, comprising:
a processor; and
a memory coupled to the processor, the memory having instructions stored thereon which, when executes by the memory, cause the device to perform method, the method comprising:
obtaining operation information and failure information associated with a plurality of disks, the plurality of disks in a storage system comprising a first set of disks indicated by the failure information as having a failure and a second set of disks indicated by the failure information as having no failure;
determining validity of the failure information associated with the first set of disks based on system context information related to the storage system;
in response to determining that the failure information associated with at least one of the first set of disks is valid, generating a machine learning model based on the operation information and the failure information associated with the first set of disks and the second set of disks, the machine learning model having a capability of predicting failure of a disk from operation information of the disk, wherein generating the machine learning model comprises:
selecting the machine learning model from a plurality of machine learning models, wherein selecting the machine learning model comprises:
selecting the machine learning model based on a first performance metric, the first performance metric indicating a probability that the machine learning model detects correctly that at least one of the first set of disks as having a failure or a probability that the machine learning model incorrectly detects that the second set of disks as having a failure; and
identifying, using the machine learning model, that a disk of the plurality of disks in the storage system may fail.

10. The device of claim 9, wherein the system context information comprises firmware error information indicating that disk firmware used by storage system has an error, and determining the validity of the failure information associated with the first set of disks comprises:
determining, based on the firmware error information, that the failure information associated with the first set of disks using the erroneous disk firmware is invalid.

11. The device of claim 9, wherein the system context information comprises topology information of the corresponding storage systems and further failure information indicating whether a connection component of the storage system has a failure, and determining the validity of the failure information associated with the first set of disks comprises:
in response to the further failure information indicating that the connection component has a failure, identifying, based on the topology information, of the first set of disks that is accessible without passing through the connection component; and
determining that the failure information associated with the first set of disks is valid.

12. The device of claim 9, wherein the system context information comprises a predetermined failure rate of failed disks for the storage system and the failure information further indicates occurrence time of failure of the first set of disks, and wherein determining the validity of the failure information associated with the first set of disks comprises:
determining whether a failure rate of the storage system in a predetermined period of time exceeds the predetermined failure rate, the predetermined period of time comprising the occurrence time; and
in response to determining that the failure rate of the storage system is below the predetermined failure rate, determining that the failure information associated with the first set of disks is valid.

13. The device of claim 9, wherein:
selecting the machine learning model further comprises using a performance metric corresponding to a stability level of a storage system.

14. The device of claim 13, wherein the stability level of the storage system to be detected is determined based on the number of failed disks in the storage system to be detected.

15. The device of claim 9, wherein the machine learning model is based on at least one of the following; a random forest model, a support vector machine model, and a neural network model.

16. The device of claim 9, wherein the operation information comprises at least one of the following: operating state statistical information, types of the plurality of disks, models of the plurality of disks, and suppliers of the plurality of disks.

17. A computer program product being tangibly stored on a computer-readable medium and comprising computer-executable instructions which, when executed, cause a machine to perform a method, the method comprising:
obtaining operation information and failure information associated with a plurality of disks, the plurality of disks in a storage system comprising a first set of disks indicated by the failure information as having a failure and a second set of disks indicated by the failure information as having no failure;
determining validity of the failure information associated with the first set of disks based on system context information related to the storage system;
in response to determining that the failure information associated with at least one of the first set of disks is valid, generating a machine learning model based on the operation information and the failure information associated with the first set of disks and the second set of disks, the machine learning model having a capability of predicting failure of a disk from operation information of the disk, wherein generating the machine learning model comprises:
selecting the machine learning model from a plurality of machine learning models, wherein selecting the machine learning model comprises:
selecting the machine learning model based on a first performance metric, the first performance metric indicating a probability that the machine learning model detects correctly that at least one of the first set of disks as having a failure or a probability that the further machine learning model incorrectly detects that the second set of disks as having a failure; and
identifying, using the machine learning model, that a disk of the plurality of disks in the storage system may fail.

18. The computer program product of claim 17, wherein the system context information comprises firmware error information indicating that disk firmware used by the storage system has an error, and determining the validity of the failure information associated with the first set of disks comprises: determining, based on the firmware error information, that the failure information associated with the first set of disks using the erroneous disk firmware is invalid.

\* \* \* \* \*